J. G. EKLUND.
MECHANICAL MOVEMENT.
APPLICATION FILED SEPT. 30, 1920.

1,422,682.

Patented July 11, 1922.
3 SHEETS—SHEET 1.

WITNESS
Philip E. Siggers

John G. Eklund, INVENTOR,
BY E. G. Siggers
ATTORNEY

J. G. EKLUND.
MECHANICAL MOVEMENT.
APPLICATION FILED SEPT. 30, 1920.
1,422,682.
Patented July 11, 1922.
3 SHEETS—SHEET 3.
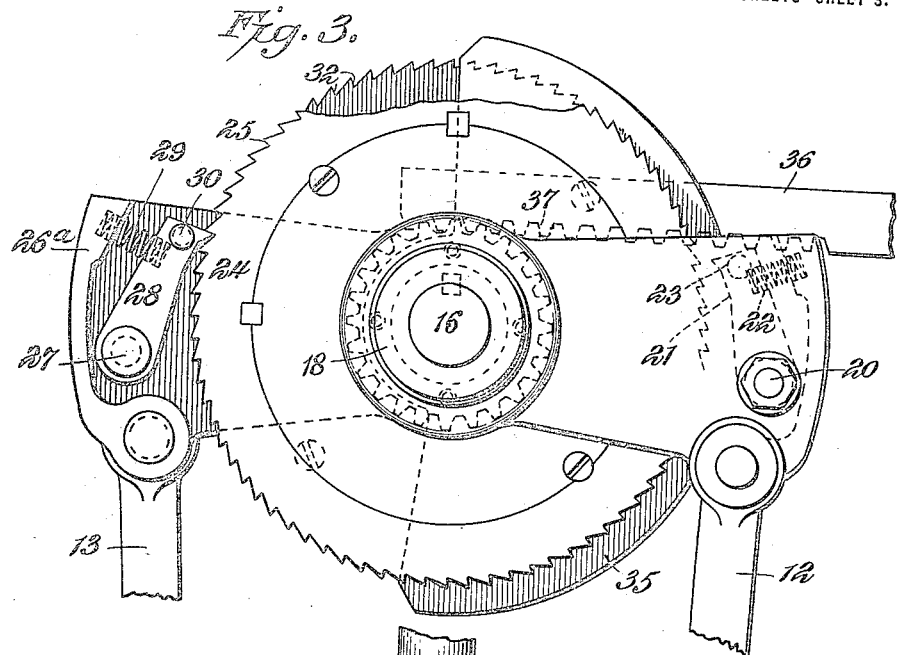
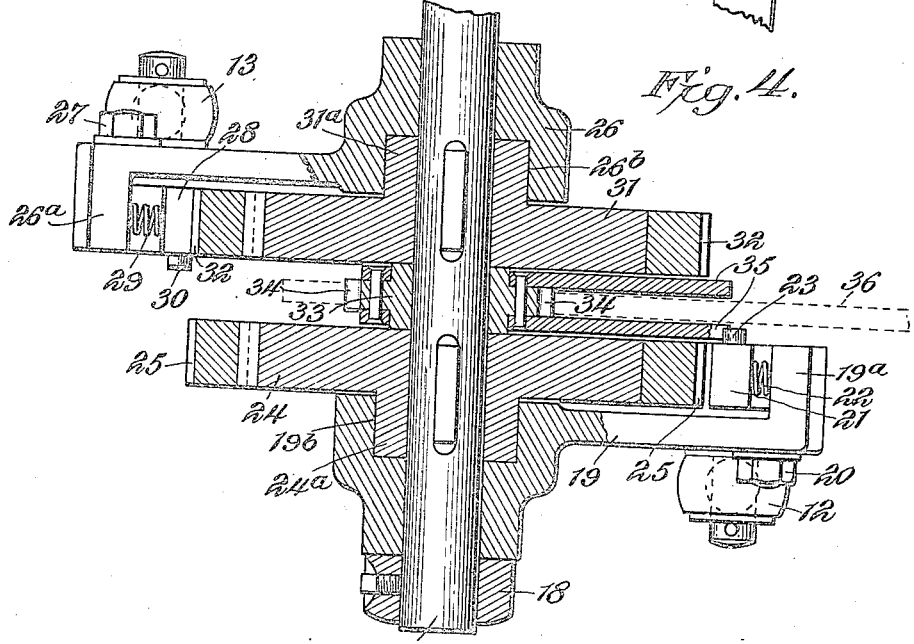
WITNESS
Philip E. Siggers
John G. Eklund, INVENTOR,
BY
E. G. Siggers
ATTORNEY

UNITED STATES PATENT OFFICE.

JOHN GUSTAV EKLUND, OF ST. JOSEPH, MICHIGAN, ASSIGNOR TO ST. JOSEPH IRON WORKS, OF ST. JOSEPH, MICHIGAN.

MECHANICAL MOVEMENT.

1,422,682. Specification of Letters Patent. Patented July 11, 1922.

Application filed September 30, 1920. Serial No. 413,854.

*To all whom it may concern:*

Be it known that I, JOHN G. EKLUND, a citizen of the United States, residing at St. Joseph, in the county of Berrien and State of Michigan, have invented a new and useful Mechanical Movement, of which the following is a specification.

The present invention relates to mechanical movements.
The general object of the invention is to provide a novel improved device of that character whereby a rotary driving element can effect intermittent rotary movement of a driven element in either direction, the device also permitting the driven element to remain idle while the driving element operates.

More specifically, the object of the invention is to provide an improved mechanical movement well adapted for use on nailing and stapling machines to be interposed between the main shaft of such a machine and the nailing or stapling mechanism. The invention has other applications than to nailing or stapling machines, however, and I do not wish to be limited to its use with any particular kind of machine.

The invention will be best understood from a consideration of the following detailed description taken in connection with the accompanying drawing forming part of this specification, with the understanding, however, that the invention is not confined to any strict conformity with the showing in the drawing, but may be changed and modified so long as such changes and modifications mark no material departure from the salient features of the invention as expressed in the appended claims.
In the drawing:—

Fig. 3 is an elevation showing the ratchets, pawls and ratchet shoes forming a part of the present mechanical movement.
Fig. 4 is a diametric cross section with parts in elevation of the mechanism of Fig. 3.

Figure 1:
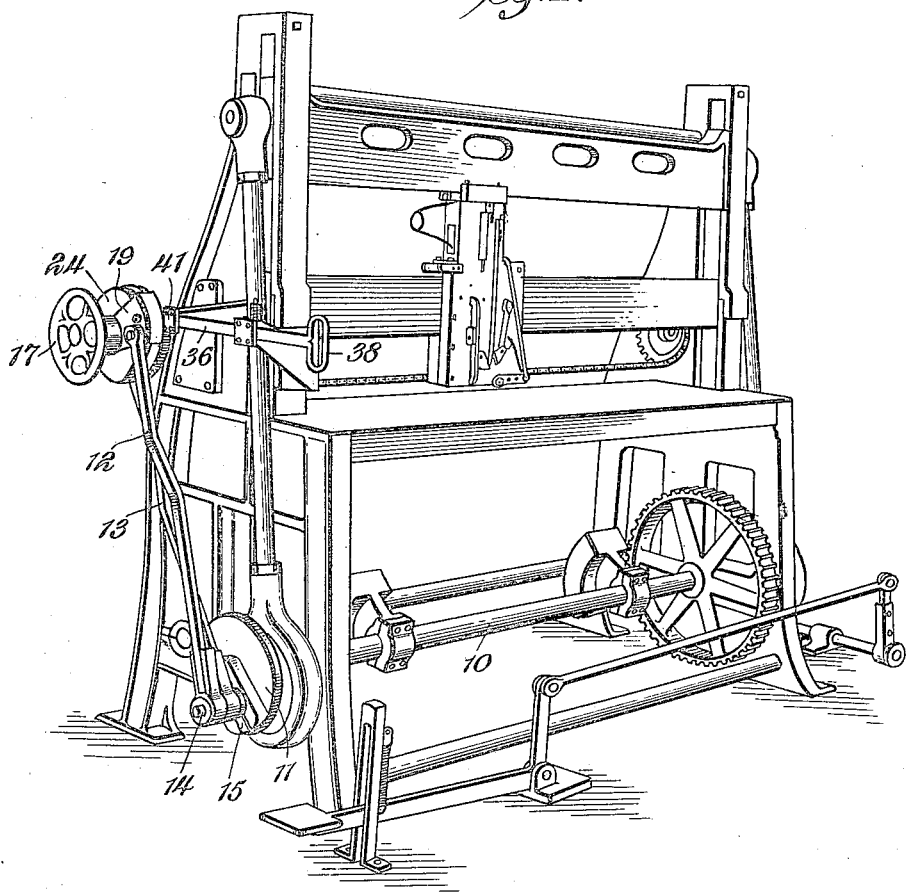
Fig. 1 is a perspective view of a modern form of stapling machine with the invention applied.

The numeral 10 denotes the main driving shaft of the stapling machine. This shaft is to be taken as indicative of any power driven shaft. Secured at one end on the shaft 10 is a crank disk 11 which is slotted as indicated at 15. A stud or similar element 14 is slidably received within the slot 15 and is adjustable therealong so that it may be clamped in adjusted positions radially of the crank disk. The stud 14 provides a pivot for the lower ends of a pair of arms 12 and 13 which are provided to transmit the rotary motion of shaft 10 into step by step or intermittent motion to the driven shaft to be described. Obviously, the closer to the periphery of the crank disk the stud 14 is secured, the longer will be the stroke of the arms 12 and 13.

The driven shaft 16 is connected by suitable gearing to a sprocket chain which effects travel of the stapling head, as will be understood. This driven shaft 16 is to be taken as indicative of any shaft of which intermittent rotary movement in either direction is desired. In the machine of Fig. 1, the shaft 16 is shown as mounting a hand wheel 17 whereby manual adjustment of the position of the stapling head may be effected when the driven shaft is disconnected from the driving shaft. In the other figures of the drawing the hand wheel 17 has been omitted, and in its place a set collar 18 is shown mounted on the shaft 16. Mounted loosely on the shaft 16 so as to turn about the shaft as an axis is a ratchet shoe 19. This ratchet shoe has an arm 19$^a$ at right angles to the outer or free end thereof and a socket 19$^b$. Carried by the ratchet shoe is a pivotal element 20 for a pawl 21, which pawl is pressed inwardly or toward the shaft 16 by a spring 22. The pawl carries on its face, remote from the ratchet shoe, a projecting lug 23.

A ratchet 24 is keyed upon the shaft 16 and has an extension hub 24$^a$ fitting within the socket 19$^b$. The pawl 21 is adapted to be engaged with the teeth 25 of the ratchet 24 so as to effect intermittent turning of the shaft 16 in one direction. Also keyed upon the shaft 16 is a second ratchet 31 having an extension hub 31$^a$ fitting into a socket 26$^b$ provided on a ratchet shoe 26 formed in exactly the same way as the ratchet shoe 19. A pawl 28 like the pawl 21 is impelled toward the ratchet 31 by a spring 29 and has an outstanding lug 30, the pawl being pivoted on the stud 27 and being partly enclosed by the extension 26$^a$. The teeth 32 of ratchet 31 are disposed in an opposite direction from the teeth 25 of ratchet 24, as is shown clearly in Fig. 3. Since the pawls 21 and 28 are disposed on opposite sides of the shaft 16, the effect of the pawls when actuated by their respective arms 12 or 13 will be to drive the shaft 16 in opposite directions.

Figure 2:
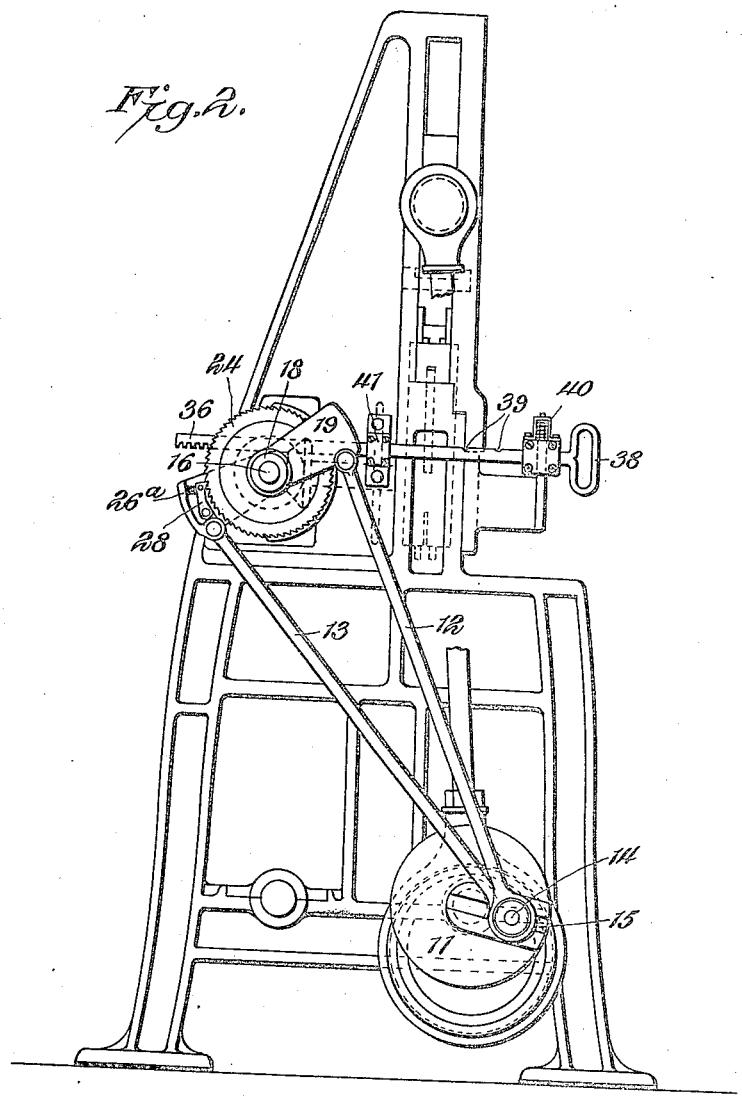
Fig. 2 is a side elevation of the machine of Fig. 1 shown on a somewhat enlarged scale.

Mounted on the shaft 16, between the ratchets and turnable on the shaft as an axis, is a pinion 33 having teeth 34. This pinion carries a pair of disks 35 which, as seen in Fig. 3, are arcuate in form and comprehend an arc greater than 180°. The two disks 35 have a common central axis, i. e., the shaft 16, and are each mounted in exactly the same way upon the pinion 33. A rack bar 36 is provided with teeth 37 which mesh with the teeth 34 of the pinion. The rack bar is of a width so as to be received between the spaced arcuate disks 35 and its function is to rotate the pinion to cause adjustment of the angular position of the disks 35. The outer end of the rack bar has a handle 38. A guide 41 is provided on the frame of the machine for the rack bar, and a spring latch 40 is also mounted upon the frame of the machine, being adapted to engage with notches 39 provided in the upper edge of the rack bar 36. There will be three of these notches 39, two of which only are seen in Fig. 2. The intermediate notch 39 is provided to hold the rack in that position where both disks 35 engage along their peripheral edges with the lugs 23 and 30 to lift both pawls free of their respective ratchets. This lifting of both pawls together may be effected because the arcuate extent of the two disks is greater than 180°. The other two notches 39 when engaged by the latch 40, hold one or the other of the disks 35 in engagement with the corresponding one of the lugs. Thus, except when the rack bar is in neutral position, one of the pawls will be engaged with its respective ratchet, and upon rotation of the shaft 10, will effect intermittent turning of the shaft 16 in the desired direction. The extent of the intermittent turning or step by step movement of the shaft 16 is varied by shifting the position of the stud 14 along the slot 15 of the crank disk. All that it is necessary to do to cause the shaft 16 to reverse its motion is to shift the rack lever 36 by either pulling or pushing on the same.

What is claimed is:—

1. A mechanical movement including a driving shaft, a driven shaft, a pair of ratchet wheels secured to the driven shaft, said ratchet wheels having their teeth extending in opposite directions, a pair of pawls interposed between the ratchet wheels and driving shaft whereby the latter is connected to either ratchet wheel to turn the same, manually operated means mounted on the driven shaft for disconnecting either pawl from its respective ratchet or both pawls from both ratchets, whereby either ratchet may be turned or both ratchets may remain idle and means for adjusting or varying the extent to which either ratchet wheel is turned by each stroke transmitted from the driving shaft.

2. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, a pinion mounted on the driven shaft and carrying means for engaging the pawls for moving either pawl or both pawls out of engagement with the ratchet wheels, manually operated means for actuating said pinion, and means impelling each pawl to seek engagement with the corresponding ratchet.

3. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks mounted on the driven shaft for holding both the pawls in a position disconnected from the ratchet wheels, and means impelling each pawl to seek engagement with the corresponding ratchet.

4. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks mounted on the driven shaft between the ratchet wheels and engageable along their peripheral edges with the pawls for holding the pawls in a position disconnected from the ratchet wheels, and means impelling each pawl to seek engagement with the corresponding ratchet.

5. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks for holding the pawls in a position disconnected from the ratchet wheels, a pinion mounted between the disks and joined thereto, and means for rotating the pinion to adjust the position of the disks.

6. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks mounted on the same shaft with both ratchet wheels and engageable along their peripheral edges with the pawls for disconnecting both pawls or either pawl from the ratchet wheels, said disks having an equal arcuate extent, and means impelling each pawl to seek engagement with the corresponding ratchet.

7. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks mounted on the same shaft with both ratchet wheels and engageable along their peripheral edges with the pawls for holding the pawls in a position disconnected from the ratchet wheels, means impelling each pawl to seek engagement with the teeth of the corresponding ratchet, a pinion mounted between the disks and joined thereto, and means for rotating the pinion to adjust the position of the disks.

8. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks mounted on the same shaft with both ratchet wheels and engageable along their peripheral edges with the pawls for holding the pawls in a position disconnected from the ratchet wheels, the disks being equal but spaced apart, means impelling each pawl to seek engagement with the teeth of the corresponding ratchet, a pinion mounted between the disks and joined thereto, and means for rotating the pinion to adjust the position of the disks.

9. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks for holding the pawls in a position disconnected from the ratchet wheel, a pinion mounted between the disks and joined thereto, a rack in mesh with the pinion for rotating the latter to effect adjustment of the position of the disks whereby the pawls are made alternately active or both inactive, and means impelling each pawl to seek engagement with the corresponding ratchet.

10. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks for holding both the pawls in a position disconnected from the ratchet wheel, a pinion mounted between the disks and joined thereto, a rack in mesh with the pinion for rotating the latter to effect adjustment of the position of the disks whereby the pawls are made alternately active or together inactive, said rack being mounted to slide longitudinally between the disks, latching means to hold the rack in predetermined positions, and means impelling each pawl to seek engagement with the corresponding ratchet.

11. A mechanical movement including a driving shaft, a driven shaft, a pair of ratchet wheels secured to the driven shaft, said ratchet wheels having their teeth extending in opposite directions, mechanism including pawls interposed between the ratchet wheels and driving shaft whereby the latter is connected to either ratchet wheel to turn the same, arcuate disks for holding the pawls in a position disconnected from the ratchet wheel, a pinion mounted between the disks and joined thereto, a rack in mesh with the pinion for rotating the latter to effect adjustment of the position of the disks, said rack being mounted to slide longitudinally between the disks, latching means to hold the rack in such positions that both pawls are inactive or else one pawl is free from its ratchet while the other pawl is active, and means impelling each pawl to seek engagement with the corresponding ratchet.

12. A mechanical movement including a driving shaft, a driven shaft, a pair of ratchet wheels secured to the driven shaft, said ratchet wheels having their teeth extending in opposite directions, mechanism including pawls interposed between the ratchet wheels and the driving shaft whereby the latter may be connected to either ratchet wheel to turn the same, means impelling each pawl to seek engagement with the corresponding ratchet, operator-controlled means movable into three positions whereby either one of the pawls engages with its ratchet to drive the shaft intermittently in one direction or the other, or both pawls are held simultaneously from engagement with their wheels, whereupon said driven shaft is disconnected from the source of power, and means whereby said driven shaft may be turned manually.

13. A mechanical movement including a driving shaft, a driven shaft, a pair of ratchets mounted on the driven shaft with their teeth extending in opposite directions, a pair of ratchet shoes mounted on the driven shaft and extending in opposite directions, each shoe partly enclosing the respective ratchet and having movement independent of said shaft, means for actuating the shoes from the driving shaft, a spring-actuated pawl carried by each ratchet shoe and urged toward the corresponding ratchet, each pawl having a lug outstanding from one side thereof, a pair of arcuate disks mounted on the driven shaft for engagement with the lugs of the pawls, and means for adjusting and holding the disks into or out of pawl engaging positions.

14. A mechanical movement including a driving shaft, a driven shaft, a pair of ratchets mounted on the driven shaft with their teeth extending in opposite directions, a pair of ratchet shoes mounted on the driven shaft and extending in opposite directions, each shoe partly enclosing the respective ratchet and having movement independent of said shaft, means for actuating the shoes from the driving shaft, a spring-actuated pawl carried by each ratchet shoe and urged toward the corresponding ratchet, a pinion mounted between the ratchets, a rack engageable by the pinion for rotating the same, said pinion having movement independent of the shaft, each pawl having a lug outstanding from one side thereof, a pair of arcuate disks mounted on said pinion for engagement with the lugs of the pawls, and means for holding the rack latched in predetermined positions.

15. A mechanical movement including a driving shaft, a driven shaft, mechanism interposed between the two shafts whereby the driven shaft may be turned intermittently in either direction, operator moved and controlled means for controlling the direction of rotation of the driven shaft and for effecting disconnection of said interposed mechanism whereby the driven shaft may be maintained at rest irrespective of the motion of the driving shaft, and means for adjusting or varying the extent to which the driven shaft is turned in either direction by the driving shaft.

In testimony, that I claim the foregoing as my own, I have hereto affixed my signature.

JOHN GUSTAV EKLUND.